US012731052B1

(12) United States Patent
Shu et al.

(10) Patent No.: US 12,731,052 B1
(45) Date of Patent: Sep. 8, 2026

(54) LARGE LANGUAGE MODEL MEMORY FOR EPISODIC AND TEMPORAL REASONING

(71) Applicant: Intuit Inc., Mountain View, CA (US)

(72) Inventors: Yiheng Shu, Mountain View, CA (US); Xiang Gao, Mountain View, CA (US); Padmaja Jonnalagedda, Mountain View, CA (US); Kamalika Das, Saratoga, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/403,747

(22) Filed: Nov. 28, 2025

(51) Int. Cl.
*G06N 5/04* (2023.01)
*G06N 5/022* (2023.01)

(52) U.S. Cl.
CPC ............... *G06N 5/04* (2013.01); *G06N 5/022* (2013.01)

(58) Field of Classification Search
CPC ................................ G06N 5/04; G06N 5/022
See application file for complete search history.

(56) References Cited

U.S. PATENT DOCUMENTS

2024/0419706 A1* 12/2024 Gutierrez .............. G06F 3/0484
2025/0094707 A1* 3/2025 Portisch ................ G06F 40/284
2025/0390352 A1* 12/2025 Crabtree ............... G06F 9/5027

FOREIGN PATENT DOCUMENTS

WO WO-2025043184 A2 * 2/2025 ............ G06N 5/022

OTHER PUBLICATIONS

Vogt, Lars, Tobias Kuhn, and Robert Hoehndorf. "Semantic units: organizing knowledge graphs into semantically meaningful units of representation." Journal of biomedical semantics 15.1 (2024): 7. (Year: 2024).*

Chhikara, Prateek, et al. "Mem0: Building production-ready ai agents with scalable long-term memory." arXiv preprint arXiv: 2504.19413 (Apr. 2025). (Year: 2025).*

Bordea, Georgeta, et al. "Siren Federate: Bridging document, relational, and graph models for exploratory graph analysis." arXiv preprint arXiv:2504.07815 (Apr. 2025). (Year: 2025).*

Hao, Guangfu, et al. "Large Language Models need Episodic Memory." International Joint Conference on Neural Networks. Jun. 2025. (Year: 2025).*

Lee, Kuang-Huei, et al. "A human-inspired reading agent with gist memory of very long contexts." arXiv preprint arXiv:2402.09727 v3 (2024). (Year: 2024).*

(Continued)

*Primary Examiner* — Randall K. Baldwin
(74) *Attorney, Agent, or Firm* — Lathrop GPM LLP

(57) ABSTRACT

Large Language Model memory includes obtaining episodic text describing a set of atomic events, and generating, for an atomic event in the set of atomic events, a gist statement from the episodic text in a natural language. The operations further include extracting a fact triple from episode text and gist list, the fact triple comprising a subject, a predicate, an object, updating, in storage, a graph with a set of fact nodes, and a connection between the first fact node and the second fact node according to the predicate, and linking, in the storage, the set of fact nodes to a stored timeline in the graph according to the timestamp. The operations further include linking the gist node to the set of fact nodes based on being generated from the gist statement in the gist node. The method also includes using the graph to respond to a query.

20 Claims, 8 Drawing Sheets

(56) References Cited

OTHER PUBLICATIONS

Chang, He, et al. "A comprehensive evaluation of large language models on temporal event forecasting." arXiv preprint arXiv: 2407. 11638 v2 (May 2025). (Year: 2025).*
Yuan, Chenhan, et al. "Back to the future: Towards explainable temporal reasoning with large language models." Proceedings of the ACM Web Conference 2024. 2024. (Year: 2024).*
Fatemi, B., et al., "Test of Time: A Benchmark for Evaluating LLMs on Temporal Reasoning", ICLE 2025, Jan. 1, 2025, 22 pages.
Chhikara, P., et al., "Mem0: Building Production-Ready AI Agents with Scalable Long-Term Memory", Apr. 28, 2025, 23 pages.
Jimenez Gutierrez, B., et al., "HippoRAG: Neurobiologically Inspired Long-Term Memory for Large Language Models", Jan. 1, 2024, 38 pages.
Bazaga, A., et al., "Learning to Reason Over Time: Timeline Self-Reflection for Improved Temporal Reasoning in Language Models", May 30, 2025, 20 pages.
Edge, D., et al., "From Local to Global: A GraphRAG Approach to Query-Focused Summarization", Feb. 19, 2025, 26 pages.
Ge, Y., et al., "TReMu: Towards Neuro-Symbolic Temporal Reasoning for LLM-Agents with Memory in Multi-Session Dialogues", Jul. 27-Aug. 1, 2025, 15 pages.
Gu, Y., et al., "Middleware for LLMs: Tools are Instrumental for Language Agents in Complex Environments", Nov. 12-16, 2024, 18 pages.
Chen, W., et al., "A Dataset for Answering Time-Sensitive Questions", Jan. 1, 2021, 13 pages.
Tan, Z., et al., "In Prospect and Retrospect: Reflective Memory Management for Long-Term Personalized Dialogue Agents", Jul. 27-Aug. 1, 2025, 24 pages.
Wu, D., et al., "LongMemEval: Bechmarking Chat Assistants on Long-Term Interactive Memory", Mar. 4, 2025, 28 pages.
Vrandecic, D., et al., "Wikidata: A Free Collaborative Knowledgebase", Oct. 1, 2014, 8 pages.
Reyna, V. F., et al., Fuzzy-Trace Theory: An Interim Synthesis, Jan. 1, 1995, 75 pages.
Yao, Y., et al., "Editing Large Language Models: Problems, Methods, and Opportunities", Nov. 30, 2023, 19 pages.
Zwaan, R. A., et al., Situation Models in Language Comprehension and Memory, Jan. 28, 1997, 24 pages.
Zhong, W., et al., "MemoryBank: Enhancing Large Language Models with Long-Term Memory", May 21, 2023, 8 pages.
Zhang, Y., et al., "Qwen3 Embedding: Advancing Text Embedding and Reranking Through Foundation Models", Jun. 11, 2025, 14 pages.
Yao, S., et al., "ReAct: Synergizing Reasoning and Acting in Language Models", Mar. 10, 2023, 33 pages.
Xu, W., et al., "A-Mem: Agentic Memory for LLM Agents" Oct. 8, 2025, 28 pages.
Wei, Y., et al., "MenatQA: A New Dataset for Testing the Temporal Comprehension and Reasoning Abilities of Large Language Models", Dec. 6-10, 2023, 14 pages.
Rasmussen, P., et al., "ZEP: A Temporal Knowledge Graph Architecture for Agent Memory", Jan. 20, 2025, 12 pages.
Tan, Q., et al., "Towards Robust Temporal Reasoning of Large Language Models via a Multi-Hop QA Dataset and Pseudo-Instruction Tuning", Aug. 11-16, 2024, 15 pages.
Papineni, K., et al., "BLEU: A Method for Automatic Evaluation of Machine Translation", Jul. 1, 2002, 8 pages.
Packer, C., et al., "MemGPT: Towards LLMs as Operating Systems", Feb. 12, 2024, 13 pages.
Lee, C., et al., "NV-Embed: Improved Techniques for Training LLMs and Generalist Embedding Models", Feb. 25, 2025, 24 pages.
Lee, D., et al., "REALTALK: A 21-day Real-World Dataset for Long-Term Conversation", Feb. 18, 2025, 20 pages.
Muennighoff, N., et al., "MTEB: Massive Text Embedding Benchmark", May 2-6, 2023, 24 pages.
Maharana, A., et al., "Evaluating Very Long-Term Conversational Memory of LLM Agents", Aug. 11-16, 2024, 20 pages.
Hu, Q., et al., "Time-Aware ReAct Agent for Temporal Knowledge Graph Question Answering", Apr. 29-May 4, 2025, 12 pages.
Jimenez Gutierrez, B., et al., "From PAG to Memory: Non-Parametric Continual Learning for Large Language Models", Jun. 19, 2025, 19 pages.
Chen, W., et al., "A Dataset for Answering Time-Sensitive Questions", Oct. 25, 2021, 13 pages.
Jimenez Gutierrez, B., et al., "HippoTAG: Neurobiologically Inspired Long-Term Memory for Large Language Models", Jan. 14, 2025, 38 pages.
Fatemi, B., et al., "Test of Time: A Benchmark for Evaluating LLMs on Temporal Reasoning", Jun. 13, 2024, 22 pages.

* cited by examiner

600

| Type | Name | Arguments |
| --- | --- | --- |
| Retrieval | semantic_retrieve | query, start_time, end_time, start_operator, end_operator |
| | lexical_retrieve | query, start_time, end_time, start_operator, end_operator |
| Graph Exploration | find_gist_contexts | gist_id, start_time, end_time, start_operator, end_operator |
| | find_entity_contexts | subject, object, predicate, start_time, end_time, start_operator, end_operator, limit, ordering, offset, aggregation |
| Flow Control | output_answer | answer |

820
Network
822
Node X
824
Node Y
826
Client Device

LARGE LANGUAGE MODEL MEMORY FOR EPISODIC AND TEMPORAL REASONING

BACKGROUND

A goal of large language models (LLMs) is to have the computing system executing the LLM emulate human intelligence in the output for a given input even if the reasoning processes are different than human reasoning. One aspect in which human's excel is at remembering concrete experiences along spatiotemporal contexts and performing reasoning across those experiences. Namely, humans have an advanced capability for episodic memory and recollection. In contrast, processing of LLMs remains mainly semantic. LLMs often rely on storage systems that store documents about concepts and knowledge about one or more domain(s) rather than experiences of the user. Thus, when processing queries that involve episodic reasoning, LLMs frequently perform sub-optimally failing to emulate the human intelligence. A problem therefore exists in how a computing system can store episodic events such that the machine learning models, like an LLM, executing on the computing system can emulate the human intelligence when processing queries involving experiences.

SUMMARY

In general, in one aspect, one or more embodiments relate to a method that includes obtaining episodic text describing a set of atomic events, and generating, for an atomic event in the set of atomic events, a gist statement from the episodic text in a natural language. The gist statement has a set of atomic event properties including a timestamp. The method further includes extracting a fact triple from episode text and gist list, the fact triple including a subject, a predicate, an object, updating, in storage, a graph with a set of fact nodes comprising a first fact node for the subject, a second fact node with the object, and a connection between the first fact node and the second fact node according to the predicate, and linking, in the storage, the set of fact nodes to a stored timeline in the graph according to the timestamp. The method further includes storing a gist node for the gist statement in the graph in the storage, and linking, in the graph in the storage, the gist node to the set of fact nodes based on being generated from the gist statement in the gist node. The method also includes using the graph to respond to a query.

In general, in one aspect, one or more embodiments relate to a system that includes a storage device including a graph storage storing a hybrid graph. The hybrid graph includes a gist storage structure storing gist nodes including a gist node for an atomic event in a set of atomic events. The gist node includes a gist statement in a natural language generated from an atomic event in episodic text describing a set of atomic events. The gist statement is associated with a timestamp. The hybrid graph includes a fact storage structure storing a set of fact nodes a first fact node for a subject in the gist statement, a second fact node with an object in the gist statement, and a connection between the first fact node and the second fact node according to a predicate in the gist statement. The hybrid graph includes a stored timeline in the hybrid graph connected to the set of fact nodes according to the timestamp. The gist node is linked to the set of fact nodes based on being generated from the gist statement in the gist node. The system also includes a computer processor executing an agentic retrieval system configured to use the hybrid graph to respond to a query.

In general, in one aspect, one or more embodiments relate to a method that includes obtaining a query, processing query through a language agent to decompose query into subqueries and select a retrieval agent for each subquery, and obtaining, for a subquery of the subqueries, a seed node and a context from a hybrid graph using the retrieval agent selected for the subquery. The method also includes selecting a graph exploration agent using the context for the subquery, processing the hybrid graph by the graph exploration agent according to the context and starting with the seed node to obtain a narrative and a temporally grounded evidence that satisfies subquery, and invoking answer output agent with the narrative and the temporally grounded evidence from subquery to generate a response. The method also includes transmitting the response.

Other aspects of one or more embodiments will be apparent from the following description and the appended claims.

BRIEF DESCRIPTION OF DRAWINGS

FIG. 6 shows an example implementation of agentic tools in accordance with one or more embodiments.

FIG. 7 shows an example comparison between different machine learning systems processing a query in accordance with one or more embodiments.

Like elements in the various figures are denoted by like reference numerals for consistency.

DETAILED DESCRIPTION

One or more embodiments are directed to an episodic storage structure that stores user data as atomic events. The episodic storage structure is a hybrid graph that links time-aware gist statements and fact nodes. The gist statements are natural language statements including a set of atomic event properties of the atomic event. Some of the atomic event properties are directly found in the episodic text describing the event while other atomic event properties may be inferred. The gist statements are stored in gist nodes in the hybrid graph. From the gist node, fact triples are extracted. The fact triple includes a subject, a predicate, and an object. Fact nodes in the hybrid graph are generated or updated linkages from the fact triple. The fact nodes are also linked to a timeline in the hybrid graph as well as the corresponding gist node from which the fact triple is obtained. Thus, the hybrid graph stores atomic events as experiences rather an ungrounded data. By storing the hybrid graph, the machine learning models are more capable of responding to queries regarding experiences from users.

Accessing the hybrid graph may be performed using an agentic retrieval. The machine learning based agentic processing includes multiple agentic tools that are controlled by a language model. Each agentic tool is a machine learning model that performs a set of operations. The agentic tools include retrieval tools to retrieve information, graph exploration tools to explore the hybrid graph, and flow control tools to generate output.

Figure 1:
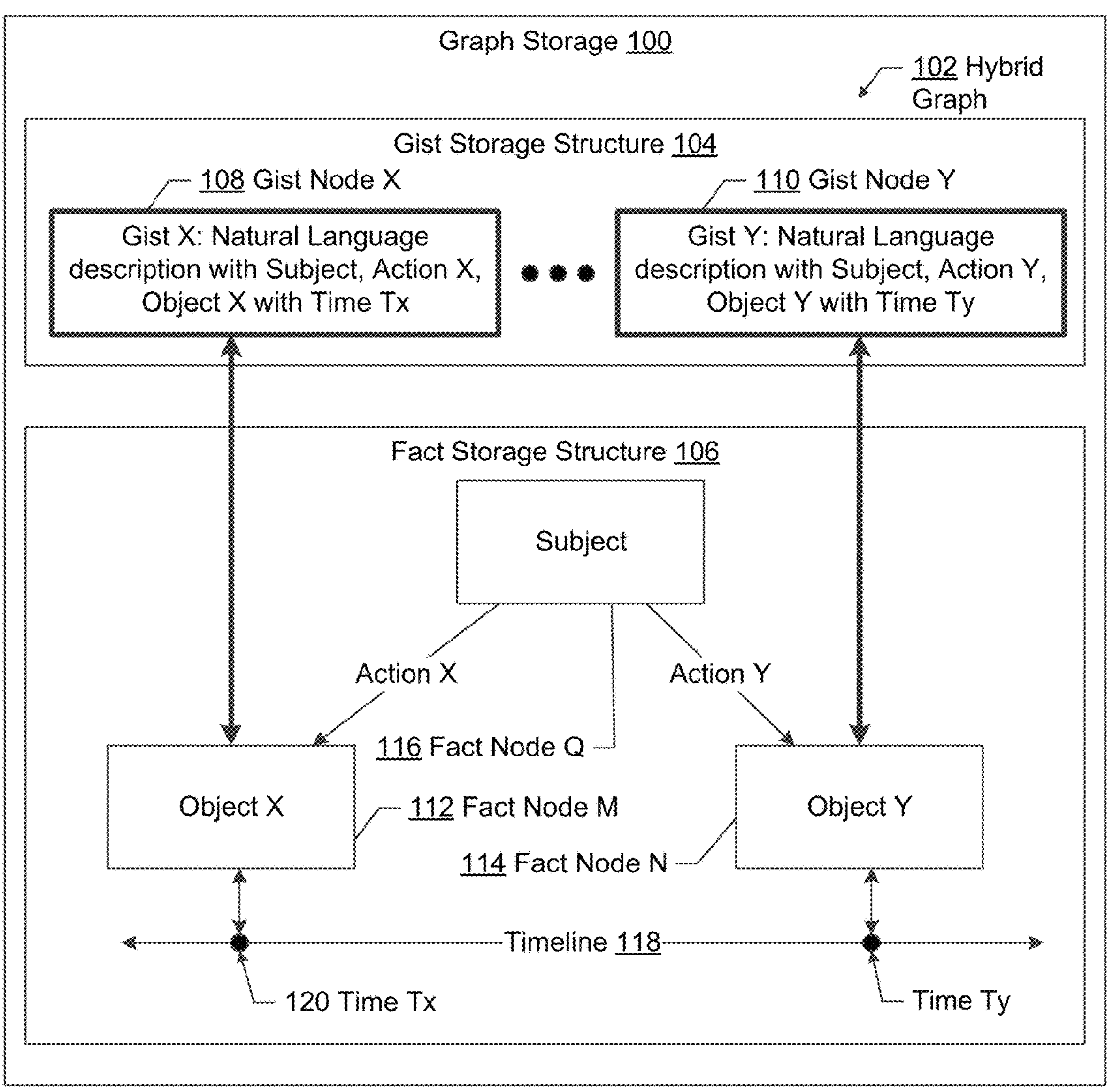
FIG. 1 shows a diagram of graph storage for the hybrid graph in accordance with one or more embodiments.

Turning to the Figures, FIG. 1 shows a diagram of graph storage (100) for the hybrid graph in accordance with one or more embodiments. The graph storage (100) is a specific storage structure in which stored nodes are linked together according to the particular node types and the data within the nodes. The nodes have a set of one or more properties about the node. The properties may include a node identifier, a node type, and one or more values having the data in the node. The links between nodes are stored references between the nodes. The stored references may also have one or more properties including a description of the type of link. Thus, the graph storage (100) is physical storage having a hybrid graph (102) (i.e., graph).

The hybrid graph (102) is a hybrid storage having a gist storage structure (104) and a fact storage structure (106). A gist storage structure (104) is a storage structure storing gist nodes (e.g., gist node X (108), gist node Y (110)). Each gist node stores a gist statement about an atomic event. In one or more embodiments, an atomic event is an action or occurrence that is indivisible (i.e., cannot be broken down into smaller steps), occurs at a single point in time, non-overlapping with other atomic events. A gist statement is a natural language description of the atomic event. Specifically, the gist statement (i.e., gist) may be in natural language sentence form. For example, a gist statement may be in a sentence having a subject of the atomic event, action of the atomic event, and object that received the action, and time. The object may be a direct or indirect object of the action.

As shown in FIG. 1, gist X has a natural language description with a subject X, action X, object X, and time Tx of a first atomic event and gist Y has a natural language description with a subject Y, action Y, object Y, and time Ty of a second atomic event. The gist statement is stored in a respective gist node. Each gist node may also have a property of a vector embedding generated from the gist statement. Namely, the vector embedding is a numerical representation of the corresponding gist statements in high dimensional space. Gist nodes having greater than a threshold similarity of corresponding vector embeddings are linked (not shown) by stored references. Thus, the gist storage structure (104) may have one or more gist nodes that are not connected to other gist nodes and one or more gist nodes that are connected to one or more other gist nodes with stored references.

The fact storage structure (106) is a storage structure storing fact triples. A fact triple is an individual sentence component of the atomic event. For example, the fact triple includes the subject, action, and object as individual elements. The fact storage structure (106) stores fact nodes connected by links. The fact nodes (e.g., fact node M (112), fact node N (114), fact node Q (116)) each store a sentence element that is the subject or object in the fact triple. The fact node has a type identifying whether the fact node is a subject, object, or indirect object. Fact nodes are linked in the fact storage structure (106) with stored links storing action properties. As shown in FIG. 1, the same fact node may be for different gist nodes when the fact node is for the same subject or object. For example, gist X and gist Y have the same subject and therefore the same fact node. Gist nodes are also linked to one or more fact nodes that the gist node creates or is updated.

Additionally, the fact nodes are connected to a timeline (118). The timeline is a storage structure that orders time consecutively. For example, the timeline may be an ordered arrangement of time nodes, which are created when atomic events are identified as corresponding to the timestamp. The timestamps may be put in timestamp order. Fact nodes are connected to the timeline according to when the fact node occurred. For example, an atomic event occurring at time Tx is stored in gist node X (108), fact node Q (116), fact node M (112), and associated with the timeline at time Tx (120).

Figure 2:
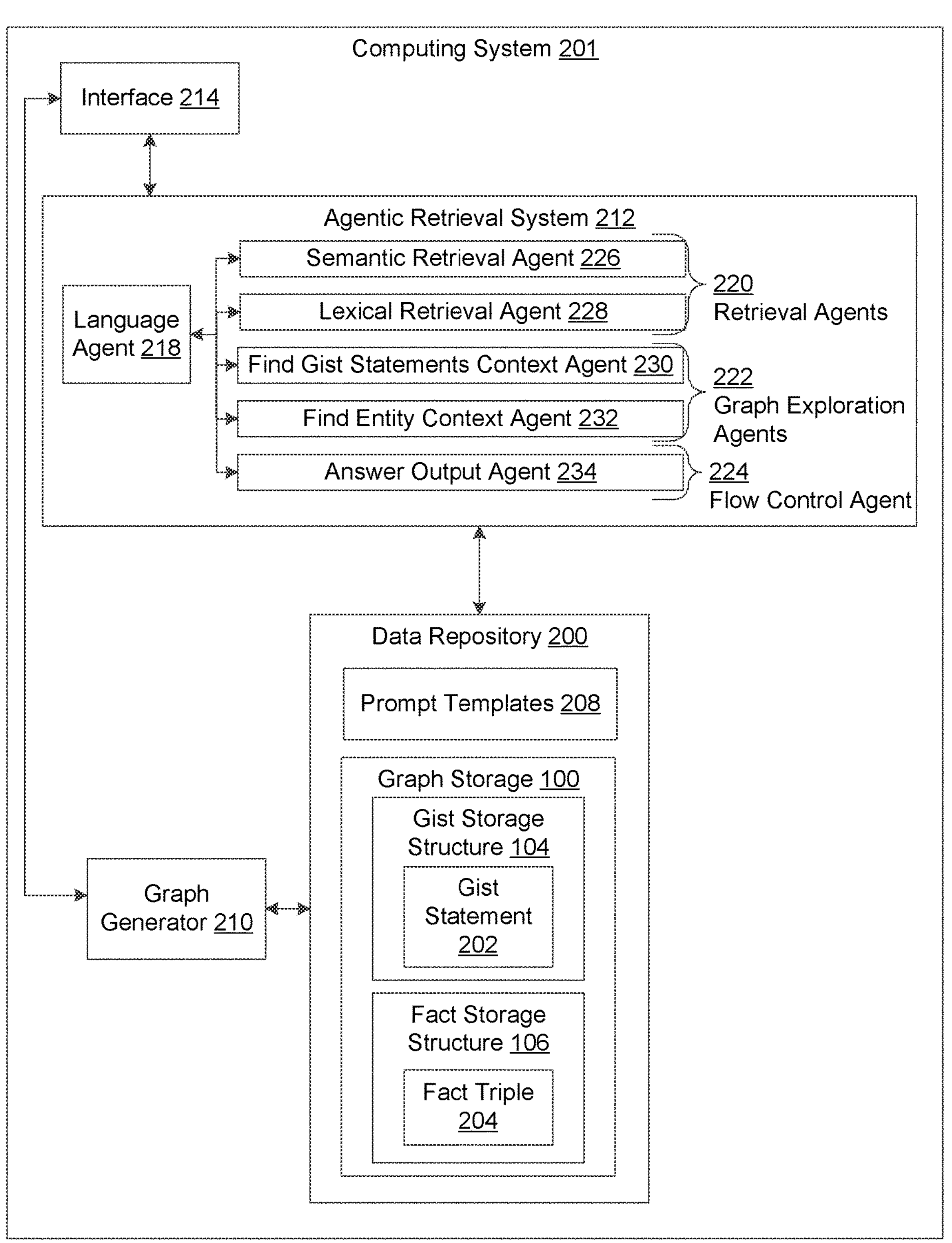
FIG. 2 shows a diagram of a system in accordance with one or more embodiments.

FIG. 2 shows a diagram of a computing system (201) in accordance with one or more embodiments. The computing system (201) is described in FIG. 8A and FIG. 8B. As shown in FIG. 2, the computing system (201) includes a data repository (200). The data repository (200) is a type of storage unit or device (e.g., a file system, database, data structure, or any other storage mechanism) for storing data. The data repository (200) may include multiple different, potentially heterogeneous, storage units and/or devices. The data repository (200) includes functionality to store the graph storage (100) with the gist storage structure (104) storing gist statements (202) and the fact storage structure (106) storing fact triples (204), all described above with reference to FIG. 1 above.

Additionally, the data repository (200) includes functionality to store one or more prompt templates (208). A prompt template (208) is a template of a prompt for sending to a language model. Specifically, a prompt template (208) includes a base level of instructions for sending to a language model.

The data repository (200) is connected to a graph generator (210). The graph generator (210) is a natural language processing system that includes an LLM and agentic components to generate the hybrid graph. The functionality of the graph generator (210) is described in reference to FIG. 3.

The data repository (200) is also connected to an agentic retrieval system (212). An agentic retrieval system (212) is configured to process a query. The agentic framework is an autonomous, goal directed framework that is configured to process the query. Specifically, the agentic retrieval system (212) is configured to retrieve episodic information from the graph storage responsive to a query.

The agentic retrieval system (212) includes a language agent (218) connected to tools (e.g., retrieval agents (220), graph exploration agents (222), flow control agents (224)). The language agent (218) is an orchestrator process that is configured to analyze the query, parse the query, and trigger execution of the tools using the parsed query. In some embodiments, the language agent (218) is configured to generate subqueries from the query. Further, the language agent (218) is configured to combine results and iteratively retrigger the process.

The retrieval agents (220) are machine learning models configured to retrieve information from the hybrid graph. Specifically, the retrieval agents (220) are configured to analyze the query or a part of a query and select one or more seed nodes and one or more contexts based on the query or the part of the query. The retrieval agents (220) include a semantic retrieval agent (226) and a lexical retrieval agent (228). The semantic retrieval agent (226) is configured to retrieve results based on semantics. Specifically, semantic retrieval is a technique used to find information based on meaning rather than exact keyword matches. Instead of searching for literal text, it uses vector embeddings to represent the semantic content of queries and documents, enabling retrieval of conceptually similar items. The semantic retrieval agent is configured to convert the text (e.g., of the query or portion thereof) from the language model into vector embeddings as well as convert or use the vector embeddings of the values of the stored nodes in the hybrid graph. The semantic retrieval agent is then configured to determine the similarity between the input and the nodes to select at least one stored node as a seed node. The semantic retrieval agent performs a search for the most semantically relevant gist statements and fact triples in the knowledge graph using embedding similarity. It returns the top results from both types at once. The semantic retrieval agent is needed with semantic understanding and conceptual matching.

The lexical retrieval agent (228) is configured to match words or phrases in the input to the lexical retrieval agent (228) to the stored nodes in the hybrid graph based on lexical similarity. The lexical retrieval agent matches based on exact words or phrases rather than meaning. The lexical retrieval agent searches for the most relevant gist statements and fact triples based on BM25 scoring. It returns the top results from both types at once for when keyword-based or exact term matching (e.g., identifiers) is to be used.

The graph exploration agents (222) are configured to explore the graph using the seed node as a starting point. When the tools execute, the tools use time constraint arguments, start time, end time, start operator, and end operator. The graph exploration agents (222) include a find gist statements context agent (230) and a find entity context agent (232). The find gist statements context agent performs a search of the hybrid graph to identify gist statements for use as context in answering the query. The find gist statements context agent explores related gist statements via synonym relationships and connected facts triples for a specific gist, with optional temporal filters. The find entity context agent (232) is configured to perform a search of the hybrid graph to find context information about the particular entity directly or indirectly referenced in the query. The find entity context agent finds facts triples that match the given criteria using at least one of subject, object, or predicate.

The flow control agent (224) includes an answer output agent (234). The answer output agent (234) is an agent that is configured to generate a natural language answer for the query or a subquery using the contexts from one or more of the graph exploration agents (222). The output answer agent (234) analyzes retrieved information and corresponding questions meticulously, answer the original query and ends the search process. For example, the answer output agent (234) may be an LLM.

The interface (214) may include one or more of an application programming interface (API), graphical user interface (GUI), or other interface of the computing system (201). The interface (214) is configured to receive the query, such as via a network or on the same computing system and transmit a response to the query. The interface may include a software interface and a hardware interface.

The specific storage structure of the hybrid graph enables the agentic retrieval system (212) to better process a query that uses episodic reasoning. Specifically, by linking gist statements to facts and the timeline, the hybrid graph better captures user experiences than other storage techniques. For example, the timeline organizes user experiences temporally while the fact storage structure links user experiences having at least one commonality together. The gist statements provide a full set of information about an atomic event. The linkages of the hybrid graph cause the LLM to better respond to episodic queries.

While FIG. 2 shows a configuration of components, other configurations may be used without departing from the scope of one or more embodiments. For example, various components may be combined to create a single component. As another example, the functionality performed by a single component may be performed by two or more components.

Figure 3:
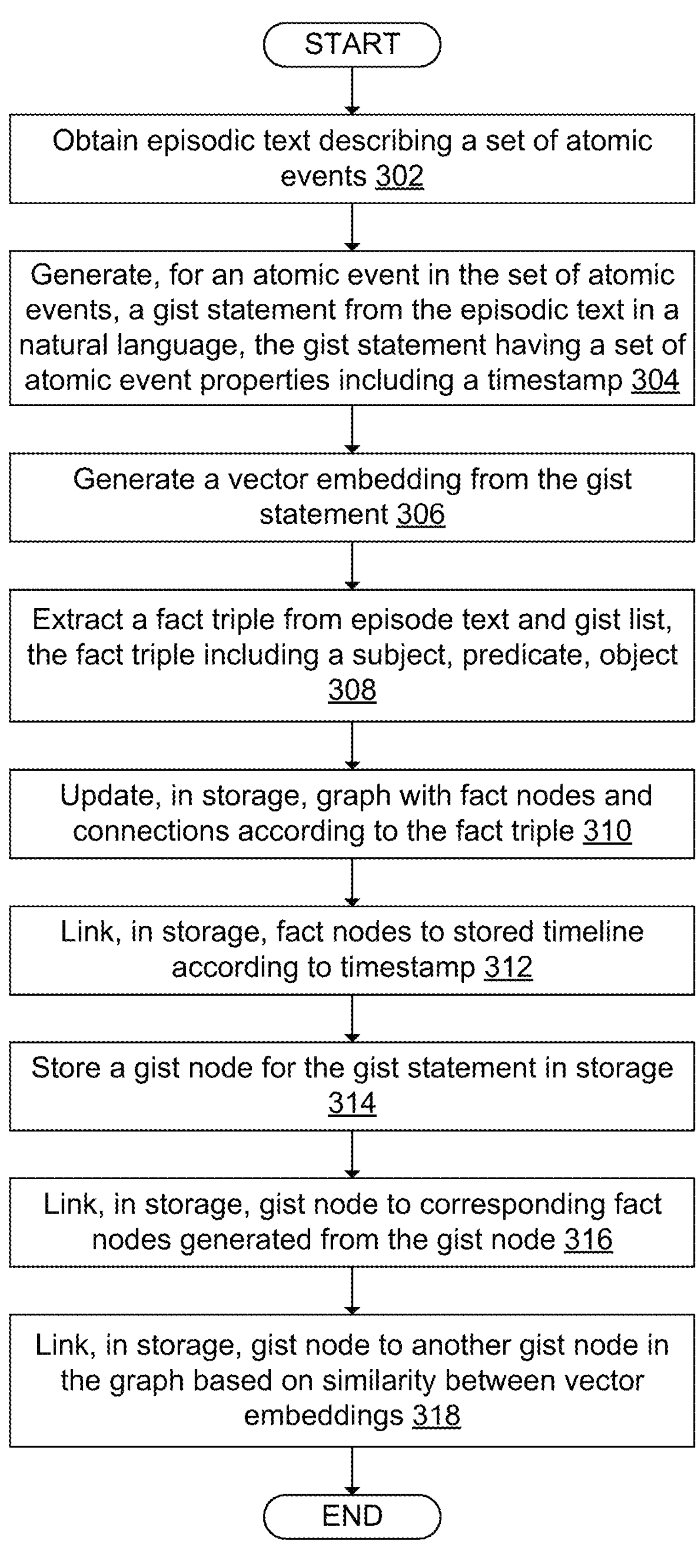
FIG. 3 shows a flowchart for generating nodes in the graph storage in accordance with one or more embodiments.
Figure 4:
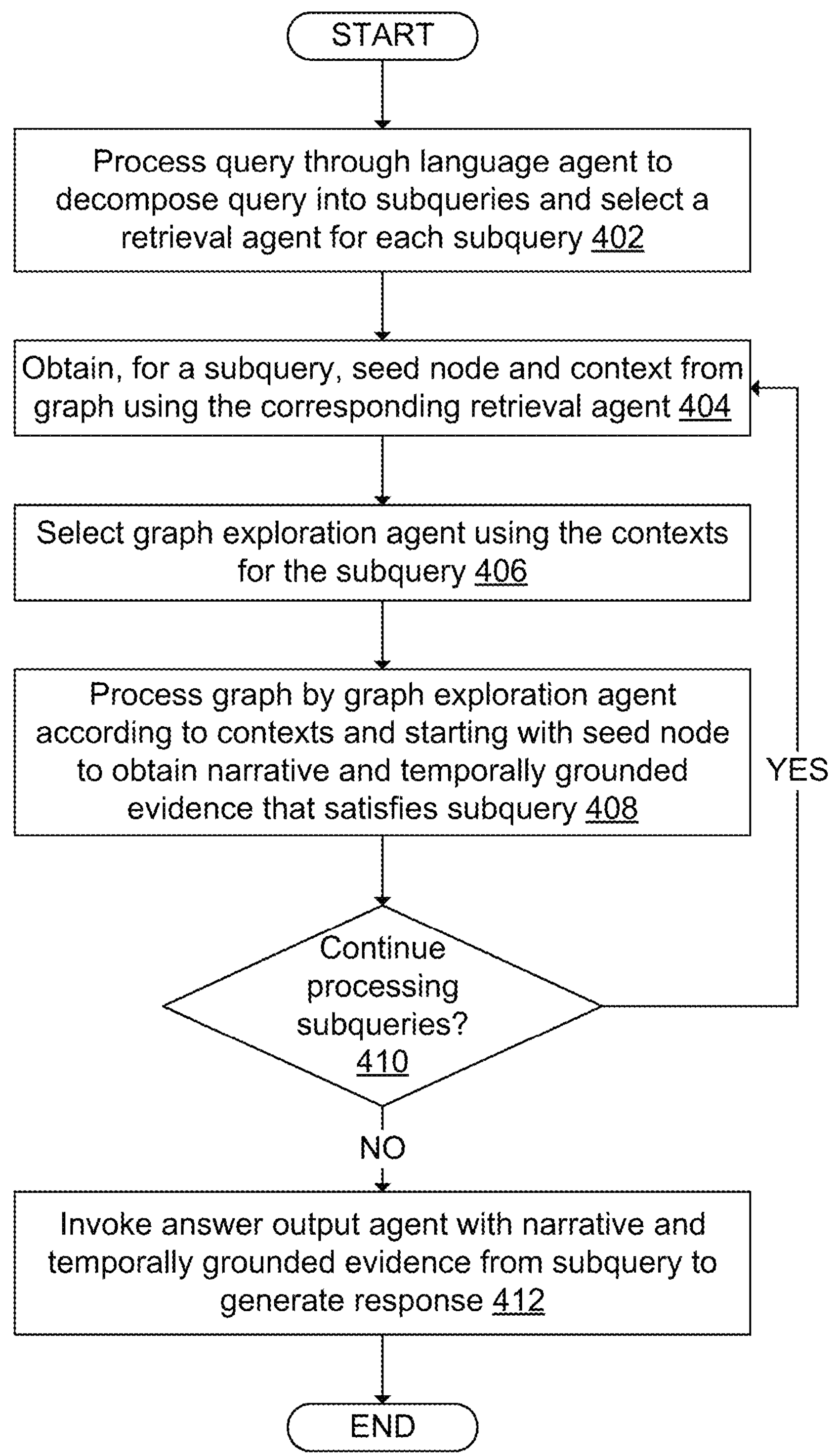
FIG. 4 shows a flowchart for using the graph storage in accordance with one or more embodiments.

FIG. 3 and FIG. 4 show flowcharts in accordance with one or more embodiments. The method of FIG. 2 may be implemented using the system of FIG. 1 and one or more of the steps may be performed on or received at one or more computer processors. While the various steps in these flowcharts are presented and described sequentially, at least some of the steps may be executed in different orders, may be combined or omitted, and at least some of the steps may be executed in parallel. Furthermore, the steps may be performed actively or passively.

FIG. 3 shows a flowchart for generating nodes in the graph storage in accordance with one or more embodiments. Block 302 includes obtaining episodic text describing a set of atomic events. During a chat session or other communication with the user, the user may provide episodic text describing various events affecting the user. The user may also save documents or include documents that describe one or more experiences of the user. The episodic text may circuitously or directly describe a variety of atomic events.

Block 304 includes generating, for an atomic event in the set of atomic events, a gist statement from the episodic text in a natural language, the gist statement having a set of atomic event properties including a timestamp. The episodic text may be passed to an LLM that is prompted to identify atomic events in the episodic text. The LLM further extracts for each atomic event, the atomic event properties. The atomic event properties may include the participants in the atomic event, the actions performed during the atomic event, the results, the objects affected or acted on directly or indirectly in the atomic event, intention, quantity, and other information. Atomic event properties that are not directly stated in the episodic text may be inferred from the episodic text using the data available. Some of the properties may be inferred. For example, if the chat session is about a trip, and the chat describes going to a concert while on the trip with a "we went to the concert," then the LLM may identify the individuals who constitute the "we" from airline tickets or other information and substitute the individuals names into the atomic event properties for the concert. The LLM is prompted to generate a gist statement, which is a natural language statement or sentence, from the atomic event properties. A timestamp is prefixed or otherwise appended to the gist statement. The time in the timestamp may be inferred. For example, if the episodic text has temporal ordering, then the time may be based on where the atomic event occurs in the temporal ordering as well as surrounding timestamps. The granularity level of the timestamp is based on the episodic text and possible inferences. Relative timestamps may be resolved to absolute time.

Block 306 includes generating a vector embedding from the gist statement. The gist statement is processed by a vector embedding model of the graph generator to generate a vector embedding of the gist statement. The vector embedding model is trained to encode the meaning of the gist statement, such that gist statements referencing similar atomic events have similar vector embeddings.

Block 308 includes extracting a fact triple from episodic text and gist list, the fact triple including a subject, predicate, object. The atomic event properties of the gist statements, or the gist statements themselves may be processed by a language model to extract the fact triple for the atomic event. The fact triple is a set having a subject, predicate, and object for the gist statement.

Block 310 includes updating, in storage, a graph with fact nodes and connections according to the fact triple. The subject and object correspond to fact nodes in the graph, while the predicate is added as a connector between the subject and the object. If a fact node for the subject or object already exists, then the fact node is updated to include the connector based on the predicate. If a fact node does not exist for the subject or object, then the fact node is created in the graph, in storage, and a connector is stored. The connector includes the properties identifying the predicate.

Block 312 includes linking, in storage, fact nodes to stored timeline according to timestamp. The timestamp appended to the gist statement is used to connect the fact node to the timeline. In some embodiments, both the subject and the object are connected to the timeline. In other embodiments, only the object is connected to the timeline. The timeline is thus linked in storage to the fact nodes for the fact triple.

Block 314 includes storing a gist node for the gist statement in storage. A gist node is created in storage that includes the gist statement.

Block 316 includes linking, in storage, the gist node to corresponding fact nodes generated from the gist node. The gist node is connected to one or more fact nodes that correspond to the same gist statement and atomic event. Thus, a hybrid graph is generated whereby each portion of the hybrid graph has different levels of granularity of detail with respect to the atomic event.

Block 318 includes linking, in storage, the gist node to another gist node in the graph based on similarity between vector embeddings. The vector embeddings of the gist nodes are compared. If vector embeddings are similar, then the gist nodes may correspond to the same type of atomic event. Thus, the atomic events are linked so as to provide a way to add additional context.

FIG. 4 shows a flowchart for using the graph storage in accordance with one or more embodiments. In one or more embodiments, a query is received. The query may be from an application or a user. Block 402 includes processing query through language agent. The language agent analyzes the query to determine whether to use a semantic or lexical retrieval agent. Further, the language agent may decompose the query into subqueries and select a retrieval agent for each subquery.

Block 404 includes obtaining, for a subquery, a seed node and a context from graph using the corresponding retrieval agent. The corresponding retrieval agent for each subquery may traverse the graph to select a seed node. The seed node may be one of a gist node or a fact node that indicates the start of the query. The context may include information surrounding the gist node and fact node.

Block 406 includes selecting a graph exploration agent that is using the contexts for the subquery. The resulting seed node and context are passed to the language agent with the subquery to select a graph exploration agent. The graph exploration agent that may provide answering information for the subquery is selected. The graph exploration agent is selected from a find gist statements context contexts agent and a find entity context contexts agent, using the context. For example, if the query is about who was present at an event, the graph exploration agent may be the find entity context agent whereas if the subquery is about what happened, the graph exploration agent may be the find gist statements context agent. The find gist statements context agent explores related gist statements via synonym relationships and connected facts triples for a specific gist, with optional temporal filters. The find entity context agent performs a search of the hybrid graph to find context information about the particular entity directly or indirectly referenced in the query. The find entity context agent finds facts triples that match the given criteria using at least one of subject, object, or predicate.

Block 408 includes processing with a processing graph by graph exploration agent according to contexts and starting with a seed node to obtain narrative and temporally grounded evidence that satisfies the subquery. The graph exploration agent traverses the hybrid graph to select gist nodes and fact nodes that answer the subquery. If the subquery has time constraints, then the stored nodes that are accessed are constrained to only those nodes connected to the timeline that satisfy the time constraints.

In Block 410, a determination is made whether to continue processing subqueries. The processing may be performed in parallel or in serial for the subqueries. Dependent subqueries may be processed after the preceding subqueries on which the dependent subqueries depend. Further, results may be analyzed by the language agent to determine whether the gathered narrative and temporally grounded evidence gathered thus far answer the query. If the narrative and the temporally grounded evidence do not answer the query, the language agent may trigger additional subqueries. If the determination is made to continue, the flow proceeds to Block 404. If the determination is made that processing subqueries is completed, the flow proceeds to block 412.

Block 412 includes invoking an answer output agent with narrative and temporally grounded evidence from the subquery to generate a response. In Block 412, the narratives and the temporally grounded evidence are combined by the language model and passed with the query to the answer output agent. The answer output agent processes the query using the narrative and temporally grounded evidence to generate the answer. The answer may be transmitted via the interface.

Figure 5:
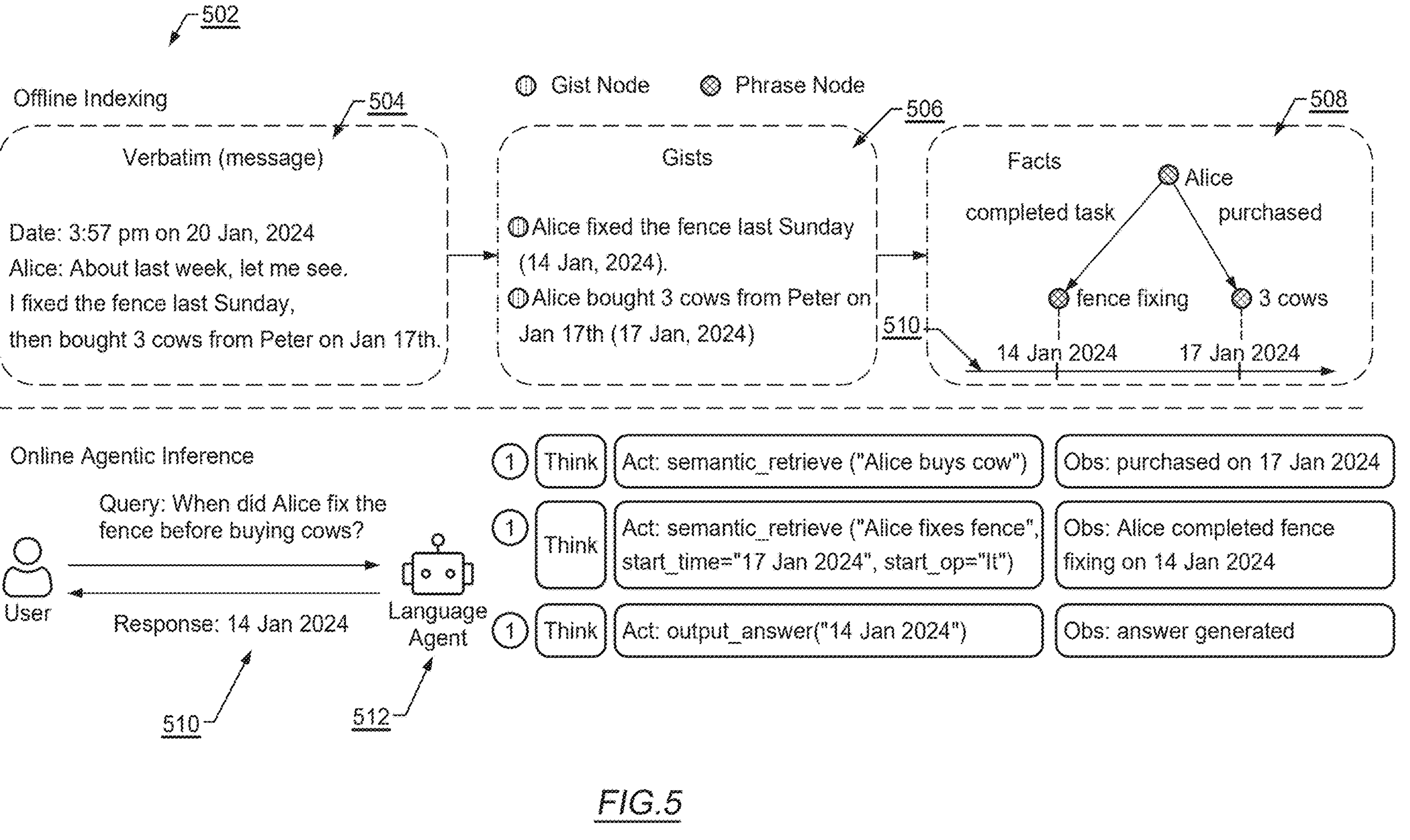
FIG. 5 shows an example of hybrid graph generation and use in accordance with one or more embodiments.
Figure 7:
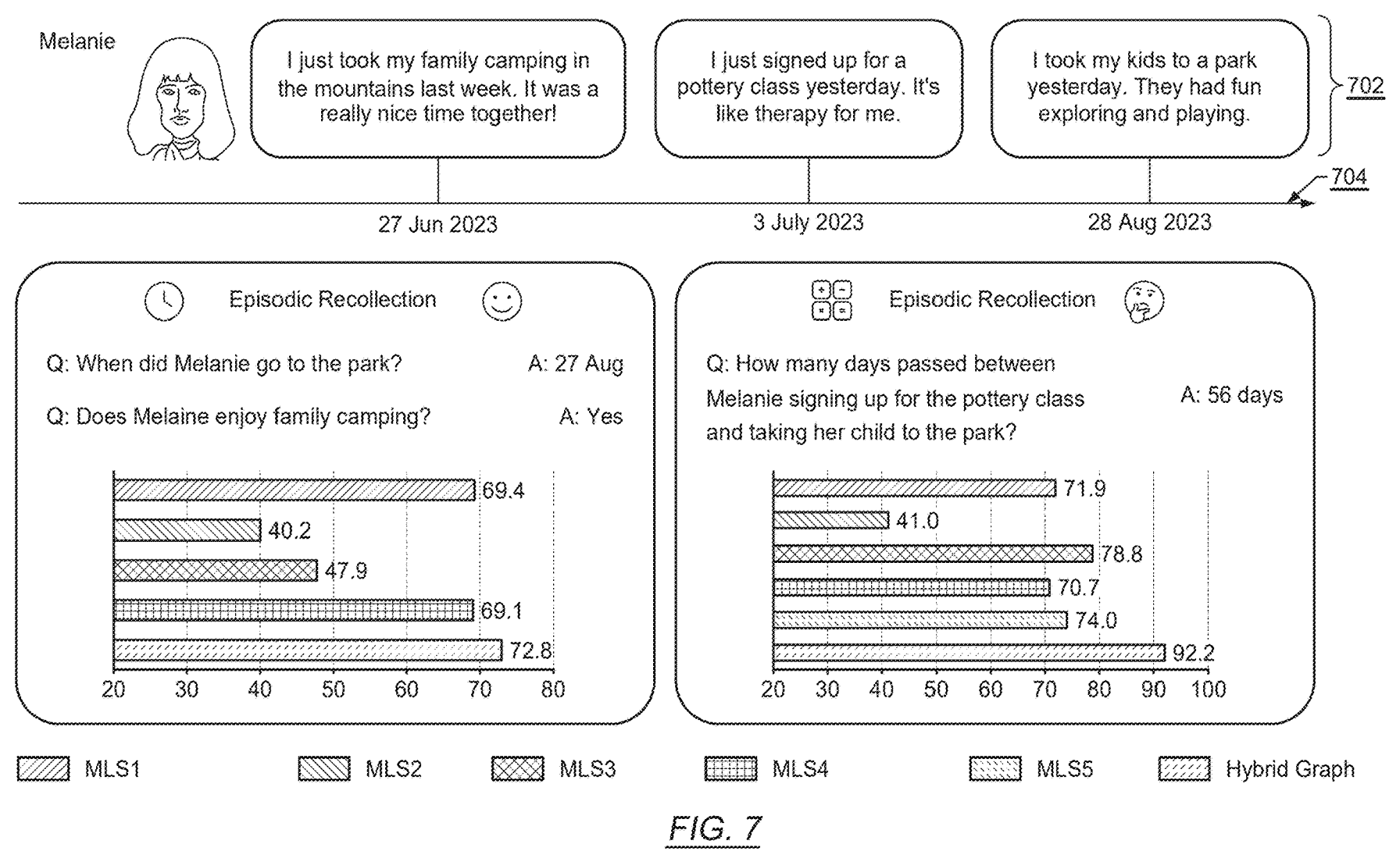

FIGS. 5-7 show examples for explanatory purposes only. FIGS. 5-7 are not intended to limit the scope of one or more embodiments.

FIG. 5 shows an example of hybrid graph generation and use in accordance with one or more embodiments. Specifically, during offline indexing (502), a message corresponding to episodic text (504) is processed. Gist extraction (506) may be performed as follows. For each event statement or chat session, one or multiple gist statements are generated in a natural language. Each gist is prefixed with the episode's timestamp (reference time), if applicable, and any relative temporal expressions are resolved to absolute dates. For each episode (e.g., a chat session), this yields a gist list (506), where each gist is a concise sentence capturing the episode's details, including participants, actions, objects, locations, intentions, and quantities, in a single atomic event description. Each gist statement forms a gist node (not expressly shown).

Fact extraction (508) may be performed as follows. Structured facts may be extracted from each episodic text (504) and the extracted gist list (506). The facts are represented as (subject, predicate, object) triples, where each field is a schema-less phrase, mainly capturing who did what to whom. Temporal contexts are also extracted (dates/times) and ground in a timeline by attaching qualifiers (e.g., point in time, start time, and end time) to the corresponding triple. Gist statements and facts are preserved as they are added over time, even when they are potentially contradictory, thereby maintaining a record that can be revisited historically.

For graph construction, using the above outputs, a hybrid graph is created that integrates gist nodes and fact nodes. Gist nodes serve as context-level episodic representations, each connected to the phrase nodes extracted from the same chunk. At the concept-level, subject and object phrase nodes of each fact are directly linked by edges, encoding the extracted relationships between those facts. Thus, a hybrid memory graph combining concept and context levels is formed. To further enhance connectivity, synonymy edges are added between gist nodes whose embedding similarity exceeds a threshold. This mechanism clusters semantically related gist statements (e.g., different phrasings of similar events) and enriches the graph with higher-level semantic connections.

The lower portion of FIG. 5 shows the online agentic framework using the offline graph generation in the top portion. Specifically, the query is processed that asks the time that Alice fixed the fence before buying cows. For retrieval (510), the language agent (512) first may invoke semantic retrieve (using an embedding model) or lexical retrieve tool to obtain truncated seed nodes and the contexts of the seed nodes from the graph (e.g., candidate entity IDs, temporal windows, and coarse topical cues). The language agent (512) decomposes complex questions into simpler sub-queries that guide the next step. During graph exploration, using the seed nodes retrieved from stage 1, the language agent issues targeted calls to find gist contexts to obtain episode-level narratives and temporally grounded evidence, or uses find entity contexts when the query explicitly targets entities under a known graph schema. Find entity contexts may not only support specifying subjects, predicates, or objects, but also filters gist statements or facts that meet specific temporal conditions. For flow control, once sufficient evidence has been gathered, the language agent (512) invokes an output answer to generate the final response upon reaching confidence. The procedure of the retrieval (510) exploits the entire interaction history, incorporating both explored gist statements and facts, to conduct the concluding reasoning.

FIG. 6 shows an example implementation of agentic tools (600) in accordance with one or more embodiments. Both the retrieval and graph exploration tool types may output two sets of results, a list of gist statements and a list of facts. As shown, both semantic retrieve and lexical retrieve tools both have input arguments of query, start time, end time, start operator, end operator. The graph exploration tools include find gist contexts and find entity contexts. The graph exploration includes using gist identifier, start time, end time, start operator, end operator, subject, object, predicate, limit, ordering, offset, and aggregation. The flow control tool type includes an output answer tool that generates an answer.

FIG. 7 shows an example comparison between different machine learning systems (i.e., MLS1, MLS2, MLS3, MLS4, MLS5, and hybrid graph) processing a query in accordance with one or more embodiments. The hybrid graph approach corresponds to embodiments described herein.

Overview of evaluation on episodic memory. Utterances (702) transmitted over time are grounded to a timeline (704). Two progressive capabilities (i.e., episodic recollection and episodic reasoning) are evaluated, and average scores are shown on each machine learning system. For episodic recollection, a determination is made as to how well temporal and other situational elements of past experiences are recollected as measured by LLM-as-a-judge scores. For episodic reasoning, multi-step reasoning across the timeline based on recollection is evaluated (e.g., event-to-event relations, counting, and ordinal queries) measured by LLM-as-a-judge score.

Episodic recollection involves reconstructing events and their situational dimensions based on experiences, such as time, location, participant, emotion, i.e., the ability to bind situational elements to specific events. Episodic reasoning includes multi-step reasoning based on episodic recollection, such as inter-event relations, ordinal constraints, and superlatives. As shown, the hybrid graph delivers gains over other machine learning systems having improvement on episodic recollection and reasoning tasks.

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

Figures 8A, 8B:
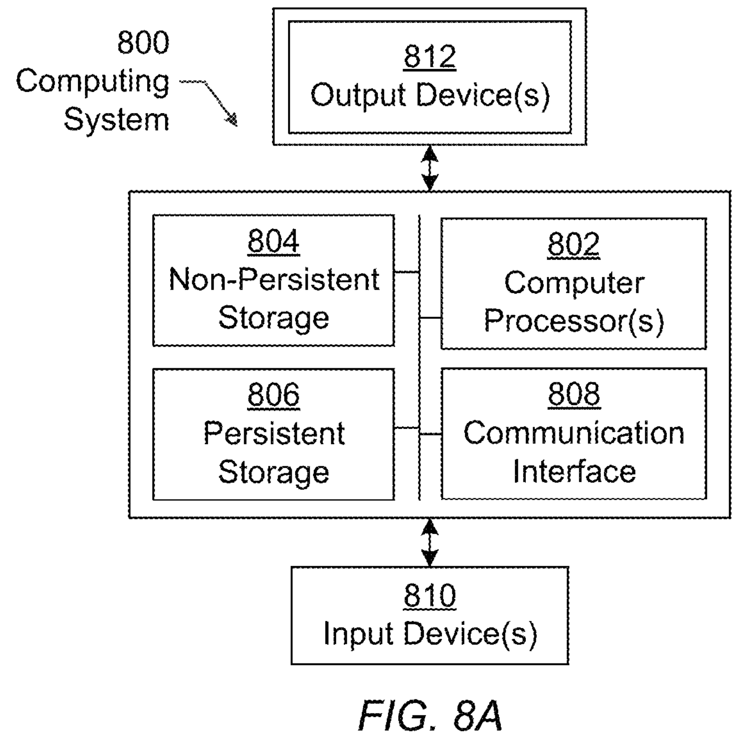
FIG. 8A and FIG. 8B show a computing system in accordance with one or more embodiments.

For example, as shown in FIG. 8A, the computing system (800) may include one or more computer processor(s) (802), non-persistent storage device(s) (804), persistent storage device(s) (806), a communication interface (808) (e.g., Bluetooth interface, infrared interface, network interface, optical interface, etc.), and numerous other elements and functionalities that implement the features and elements of the disclosure. The computer processor(s) (802) may be an integrated circuit for processing instructions. The computer processor(s) (802) may be one or more cores, or micro-cores, of a processor. The computer processor(s) (802) includes one or more processors. The computer processor(s) (802) may include a central processing unit (CPU), a graphics processing unit (GPU), a tensor processing unit (TPU), combinations thereof, etc.

The input device(s) (810) may include a touchscreen, keyboard, mouse, microphone, touchpad, electronic pen, or any other type of input device. The input device(s) (810) may receive inputs from a user that are responsive to data and messages presented by the output device(s) (812). The inputs may include text input, audio input, video input, etc., which may be processed and transmitted by the computing system (800) in accordance with one or more embodiments. The communication interface (808) may include an integrated circuit for connecting the computing system (800) to a network (not shown) (e.g., a local area network (LAN), a wide area network (WAN) such as the Internet, mobile network, or any other type of network) or to another device, such as another computing device, and combinations thereof.

Further, the output device(s) (812) may include a display device, a printer, external storage, or any other output device. One or more of the output device(s) (812) may be the same or different from the input device(s) (810). The input device(s) (810) and output device(s) (812) may be locally or remotely connected to the computer processor(s) (802). Many different types of computing systems exist, and the aforementioned input device(s) (810) and output device(s) (812) may take other forms. The output device(s) (812) may display data and messages that are transmitted and received by the computing system (800). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (802), is configured to perform one or more embodiments, which may include transmitting, receiving, presenting, and displaying data and messages described in the other figures of the disclosure.

The computing system (800) in FIG. 8A may be connected to, or be a part of, a network. For example, as shown in FIG. 8B, the network (820) may include multiple nodes (e.g., node X (822) and node Y (824), as well as extant intervening nodes between node X (822) and node Y (824)). Each node may correspond to a computing system, such as the computing system shown in FIG. 8A, or a group of nodes combined may correspond to the computing system shown in FIG. 8A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (800) may be located at a remote location and connected to the other elements over a network.

The nodes (e.g., node X (822) and node Y (824)) in the network (820) may be configured to provide services for a client device (826). The services may include receiving requests and transmitting responses to the client device (826). For example, the nodes may be part of a cloud computing system. The client device (826) may be a computing system, such as the computing system shown in FIG. 8A. Further, the client device (826) may include or perform all or a portion of one or more embodiments.

The computing system of FIG. 8A may include functionality to present data (including raw data, processed data, and combinations thereof) such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before," "after," "single," and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:

obtaining episodic text describing a set of atomic events;

generating, for an atomic event in the set of atomic events, a gist statement from the episodic text in a natural language, the gist statement having a set of atomic event properties including a timestamp;

extracting a fact triple from the episodic text and the gist statement, the fact triple comprising a subject, a predicate, an object;

updating, in storage, a graph to include a set of fact nodes comprising a first fact node for the subject, a second fact node with the object, and a connection between the first fact node and the second fact node according to the predicate;

linking, in the storage, the set of fact nodes to a time node in a stored timeline in the graph according to the timestamp, wherein the time node is for the timestamp, and wherein the stored timeline stores an order arrangement of a plurality of time nodes that is ordered consecutively by time;

storing a gist node for the gist statement in a gist storage structure in the graph in the storage, wherein the gist storage structure stores a plurality of gist nodes for a plurality of gist statements;

linking, in the graph in the storage, the gist node to the set of fact nodes responsive to the gist statement of the gist node causing the updating of the graph to include the set of fact nodes; and using the graph to respond to a query.

2. The method of claim 1, further comprising:

extracting, with a large language model, the set of atomic events from the episodic text;

inferring, with the large language model, a time of the atomic event from context of the episodic text; and generating the timestamp with the time of the episodic text.

3. The method of claim 1, wherein the episodic text is obtained from a chat session with a user through a user interface.

4. The method of claim 1, further comprising:

generating, by an embedding model, a first vector embedding from the gist statement; and linking, in storage, the gist node to a second gist node in the graph based on a calculated similarity between the first vector embedding and a second vector embedding of the second gist node.

5. The method of claim 1, further comprising:

receiving the query through an interface; and processing the query through a language model and a plurality of agentic tools.

6. The method of claim 5, further comprising:

processing the query through a language agent to select a retrieval agent;

obtaining, for a subquery, a seed node and a context from the graph using the retrieval agent;

exploring the graph by a graph exploration agent according to contexts and starting with the seed node to obtain a narrative and a temporally grounded evidence that satisfies at least in part the query;

invoking an answer output agent with the narrative and the temporally grounded evidence to generate a response; and transmitting the response.

7. The method of claim 6, further comprising:

selecting from a semantic retrieval agent and a lexical retrieval agent, the retrieval agent, wherein processing the query is performed with the selected retrieval agent.

8. The method of claim 6, further comprising:

selecting, from a find gist statements context agent and a find entity context agent, the graph exploration agent using the context.

9. The method of claim 1, further comprising:

partitioning the query into a plurality of subqueries; and for each subquery of the plurality of subqueries:

selecting a retrieval tool for the subquery to obtain a selected retrieval tool, retrieving, by the selected retrieval tool, a seed node and a context for the subquery, and processing, by a graph exploration agent, the graph starting with the seed node and using the context to generate a narrative and temporally grounded evidence for the subquery; and generating a response using, for each subquery of the plurality of subqueries, the narrative and the temporally grounded evidence.

10. A system comprising:

a storage device comprising a graph storage, the graph storage storing a hybrid graph, wherein the hybrid graph comprises:

a gist storage structure storing a plurality of gist nodes comprising a gist node for an atomic event in a set of atomic events, the gist node comprising a gist statement in a natural language generated from the atomic event in episodic text describing a set of atomic events, wherein the gist statement is associated with a timestamp, a fact storage structure storing a set of fact nodes a first fact node for a subject in the gist statement, a second fact node with an object in the gist statement, and a connection between the first fact node and the second fact node according to a predicate in the gist statement, a stored timeline in the hybrid graph connected to the set of fact nodes according to the timestamp, wherein the stored timeline stores an order arrangement of a plurality of time nodes that is ordered consecutively by time as defined by a corresponding timestamp, wherein the gist node is linked to the set of fact nodes responsive to the gist statement of the gist node causing an updating of the hybrid graph to include the set of fact nodes; and a computer processor executing an agentic retrieval system configured to use the hybrid graph to respond to a query.

11. The system of claim 10, wherein the system:

extracts, with a large language model, the set of atomic events from the episodic text, infers, with the large language model, a time of the atomic event from context of the episodic text, and generates the timestamp with the time of the episodic text.

12. The system of claim 10, wherein the episodic text is obtained from a chat session with a user through a user interface.

13. The system of claim 10, wherein:

an embedding model generates a first vector embedding from the gist statement, and storage comprises a link of the gist node to a second gist node in the hybrid graph based on a calculated similarity between the first vector embedding and a second vector embedding of the second gist node.

14. The system of claim 10, wherein:

the system receives the query via a user interface, and the agentic retrieval system is configured to process the query through a language model and a plurality of agentic tools.

15. The system of claim 14, wherein the agentic retrieval system is further configured to:

process the query through a language agent to select a retrieval agent;

obtain, for a subquery, a seed node and a context from the hybrid graph using the retrieval agent;

explore the hybrid graph by a graph exploration agent according to contexts and starting with the seed node to obtain a narrative and a temporally grounded evidence that satisfies at least in part the query;

invoke an answer output agent with the narrative and the temporally grounded evidence to generate a response; and transmit the response.

16. The system of claim 15, wherein the agentic retrieval system is further configured to:

select from a semantic retrieval agent and a lexical retrieval agent, the retrieval agent, wherein processing the query is performed with the selected retrieval agent.

17. The system of claim 15, wherein the agentic retrieval system is further configured to:

select, from a find gist statements context agent and a find entity context agent, the graph exploration agent using the context.

18. The system of claim 10, wherein the agentic retrieval system is further configured to:

partition the query into a plurality of subqueries;

for each subquery of the plurality of subqueries:

select a retrieval tool for the subquery to obtain a selected retrieval tool, retrieve, by the selected retrieval tool, a seed node and a context for the subquery, and process, by a graph exploration agent, the hybrid graph starting with the seed node and using the context to generate a narrative and temporally grounded evidence for the subquery; and generate a response using, for each subquery of the plurality of subqueries, the narrative and the temporally grounded evidence for each subquery.

19. A method comprising:

obtaining a query;

processing the query through a language agent to decompose the query into a plurality of subqueries and select a retrieval agent for each subquery of the plurality of subqueries;

obtaining, for a subquery of the plurality of subqueries, a seed node and a context from a hybrid graph using the retrieval agent selected for the subquery, wherein the hybrid graph comprises:

a gist storage structure storing a plurality of gist nodes comprising a gist node for an atomic event in a set of atomic events, the gist node comprising a gist statement in a natural language generated from the atomic event in episodic text describing a set of atomic events, wherein the gist statement is associated with a timestamp, a fact storage structure storing a set of fact nodes a first fact node for a subject in the gist statement, a second fact node with an object in the gist statement, and a connection between the first fact node and the second fact node according to a predicate in the gist statement, a stored timeline in the hybrid graph connected to the set of fact nodes according to the timestamp, and wherein the stored timeline stores an order arrangement of a plurality of time nodes that is ordered consecutively by time as defined by a corresponding timestamp, wherein the gist node is linked to the set of fact nodes responsive to the gist statement of the gist node causing the updating of the hybrid graph to include the set of fact nodes;

selecting a graph exploration agent using the context from the hybrid graph that is obtained for the subquery;

processing, by the graph exploration agent, the hybrid graph starting with the seed node to obtain a narrative and temporally grounded evidence that satisfies subquery, wherein processing the hybrid graph is according to the context;

invoking an answer output agent with the narrative and the temporally grounded evidence from the subquery to generate a response; and transmitting the response.

20. The method of claim 19, further comprising:

combining the narrative and the temporally grounded evidence for the plurality of subqueries into input for a large language model; and processing the input and the query to generate the response.

* * * * *